UNITED STATES PATENT OFFICE.

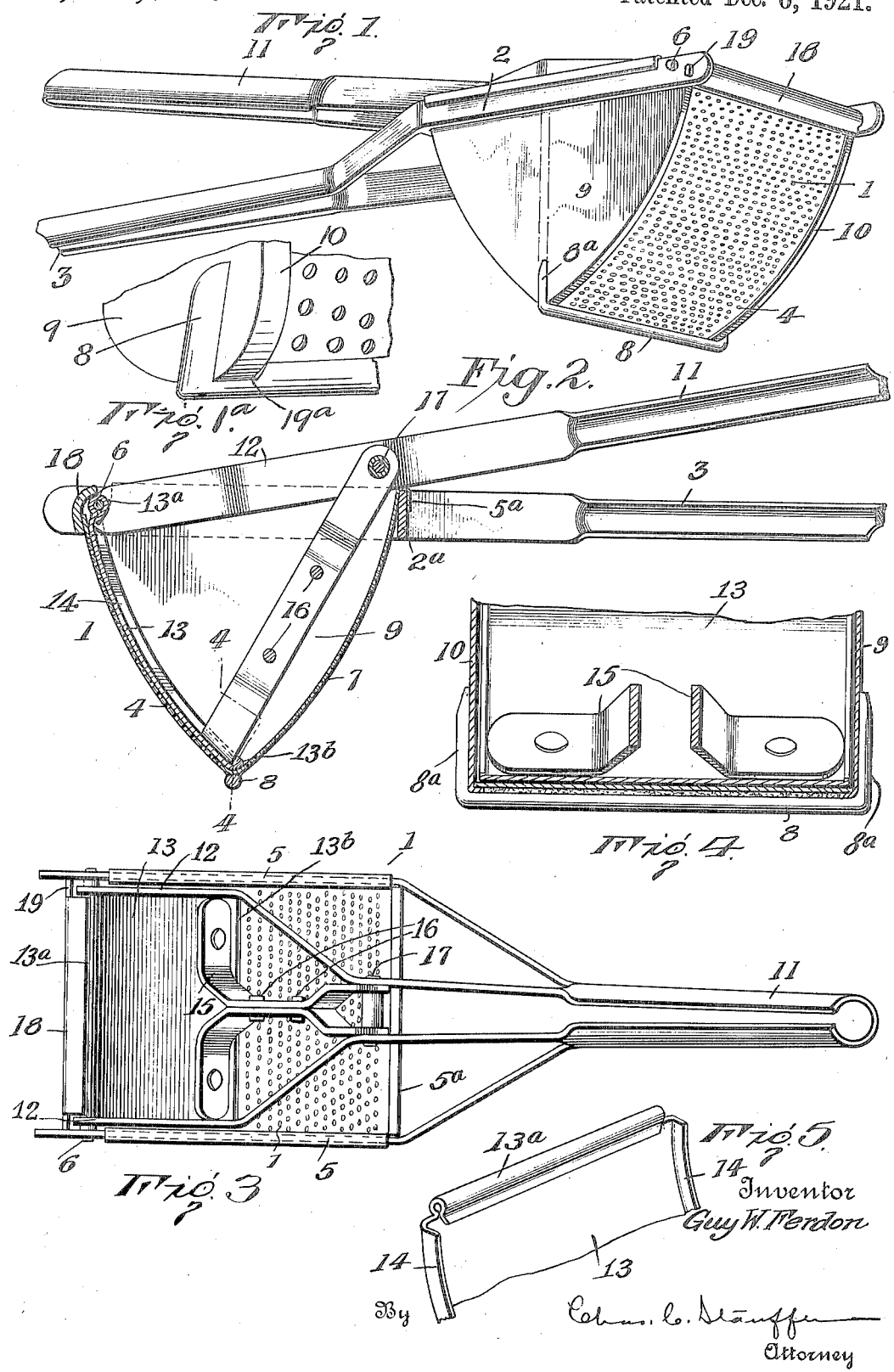

GUY W. FERDON, OF CRESSKILL, NEW JERSEY.

FOOD-PRESS.

1,399,708. Specification of Letters Patent. Patented Dec. 6, 1921.

Application filed January 26, 1920. Serial No. 354,185.

*To all whom it may concern:*

Be it known that I, GUY W. FERDON, a citizen of the United States, residing at Cresskill, in the county of Bergen and State of New Jersey, have invented certain new and useful Improvements in Food-Presses, of which the following is a specification, reference being had therein to the accompanying drawing.

My invention relates to food presses for culinary use. These are used for extracting juices from fruits, soup from stock, and juices from similar materials, for mashing or "ricing" potatoes and for similar purposes. It consists in a perforated hopper or food container, and a press therefor. I have made a strong and durable press, one that has features which give it great strength to resist pressure and prevent its opening up or bursting at the seams, one which avoids loss by preventing the escape of liquid except through the perforations of the container, and one which has various other advantages and points of novelty as will appear in the following description.

My invention relates to several features of structure, namely, the frame-work, the handle, the plunger brace, the cover strip to prevent the escape of material at the back, the apex guard and other features.

In the drawing:—

Figure 1 is a perspective view showing my device.

Fig. 1ª is a detail view.

Fig. 2 is a sectional view.

Fig. 3 is a top plan view.

Fig. 4 is a section on the line 4—4 of Fig. 2.

Fig. 5 is a fragmentary view showing my hinge cover or shield.

In the drawing 1, represents the food container which is of the usual perforated type though preferably larger than the ordinary kitchen appliance, as my present device is made on a larger and stronger scale to meet the demands of hotels, restaurants and other places where considerable quantities of food are manipulated, and such utensils are subjected to constant and hard use. This container is made of heavy tin perforated as indicated, and is mounted or supported upon the frame member 2, which is made of a piece of band iron bent in the middle to form a handle 3 and extended forward and shaped with the cross bar 2ª (see Fig. 2) in the form of a rectangle adapted to inclose the top of the container 4. The upper edge of the container is provided with lips 5 bent over the rectangular frame work of the rectangle at each side, and at the rear as at 5ª, see Figs. 2 and 3, and soldered in place. At the forward end this container is provided with the pintle 6. This container is provided with two curved sides, as shown, giving the container a substantially V shape. The curve of side 7, Fig 2, is an arc of a circle having the pintle 6 as its center, and the curve on the opposite side is preferably made substantially the same for the sake of symmetry At the bottom of the container the two sides are made to meet and are there soldered, or otherwise fastened together to form an apex. As a protection for this apex, I have the guard 8, which extends across the apex and part way, or if preferred all the way, up the ends 9 of the container, which ends are flat and imperforate. Each of these ends 9 is provided with flanges 10 into which the sides of the V fit, and to which they are united in any suitable way, preferably by soldering. The arms 8ª of the guard 8 prevent the opening of the seams of the container at the sides or bottom, under pressure. That is, they enable the structure to withstand all the pressure that it is likely to be subjected to.

The guard at the bottom also serves as a protector for the apex which is subject to considerable wear. Sometimes these implements are subjected to considerable force and violence as from blows struck on a block or table by rapping the point of the utensil thereon in order to free it from attached particles of food or otherwise. This bar takes the blow. It also acts as a stop, when the utensil is used, as it frequently is, in a saucepan or similar receptacle or on a table and the guard forms a bearing upon which the pressure and force of the manipulator of the device is directed; thereby also guarding the device against injury and prolonging its life.

On the pintle 6, I hinge the upper handle 11, also made of a piece of band iron bent to the desired shape and extended forward, as shown in Fig. 3, in divergent arms 12. In the ends of these arms is placed the pintle 6, before referred to, so that a hinge is formed for the upper arm or member of the structure. I mount between the arms on the same pintle the plunger member 13 of the press, and this plunger member consists of an imperforate plate shaped to register with the interior of the container, as seen in Fig. 2. This plunger member is provided with flanges 14 on each side to give it stiffness and an upper wider flange 13ª where it is bent around the pintle, and it also has a similar stiffening up-turned flange 13ᵇ at the lower end.

I extend a brace 15 from the lower end of this plunger to some convenient part of the handle, which brace preferably is of the form shown in Figs. 2 and 3.

This brace extends across the whole face of the plunger, and consists of two parts riveted together at 16 and made divergent to engage the forks of the upper handle to which they are secured by a bolt 17, or by any other suitable means, as by solder, or both. I unite the forward ends of the upper part or handle by means of the bar 18, which passes through the forward ends of the handle at 19 and is riveted or otherwise secured thereto. This bar is made wide and is curved in cross section, as shown in Fig. 2, so that it extends over the aforesaid pintle 6 thus closing the opening or crack which exists between the plunger and the left wall of the container, so that, when pressure is applied, liquid or solids will not squirt out of said crack, but will be prevented from escaping and will be diverted back toward the receptacle. The bar 8 serves as a buttressing point to protect the entire container as a stop against the forward pressing movement which occurs when the device is used under hard pressure and as a brace or clamp for holding the sides together.

It should be remembered that if the container is even slightly out of true the plunger will not operate or will not "go home" perfectly and properly. The container in filling rests on the protecting bar 8.

The handles and bars are preferably tinned over thickly, and the sides and ends of the receptacle are made of heavy plate in which the perforations in the sides are carried nearly, but not quite, to the top.

Having thus described my invention what I claim and desire to secure by Letters Patent, is:—

1. A lever press comprising a perforated food container having plane ends and curved perforated sides, said sides meeting at their lower edges to form a substantially V-shaped cross section, and a reinforcing bar secured to the apex of the V and serving as a guard for said apex.

2. A lever press comprising a perforated container substantially V-shaped in cross section, a pivoted plunger adapted to swing into said container, a lever pivoted to said container and connected to the upper end of said plunger, a brace connecting said lever and the lower end of said plunger, and a reinforcing bar secured to the apex of said container and serving as a guard for said apex.

3. A lever press comprising a frame, a food container having plane end walls and curved perforated side walls secured to said frame, a pintle spanning said end walls near the outer end thereof and parallel to said side walls, a bifurcated lever pivoted on said pintle, a plunger also pivoted on said pintle, a brace connecting said lever and said plunger and a strip curved in cross section and secured to the outer curved wall of the food container and covering the crack between said pintle and the upper edge of the outer curved wall aforesaid.

4. A lever press comprising a frame, a food container having plane end walls and curved perforated side walls secured to said frame, forming a substantially V-shaped cross section, with a reinforcing bar secured to the apex of the V and serving as a guard therefor, a pintle spanning said end walls near the outer end thereof and parallel to said side walls, a bifurcated lever pivoted on said pintle, a plunger also pivoted on said pintle, and rigidly attached to said lever, and a strip curved in cross section and covering the crack between said pintle and the upper edge of the outer curved wall aforesaid.

5. A lever press comprising a frame, a food container having plane end walls and curved perforated side walls secured to said frame, forming a substantially V-shaped cross section, with a reinforcing bar secured to the apex of the V and serving as a guard therefor, a pintle spanning said end walls near the outer end thereof and parallel to said side walls, a bifurcated lever pivoted on said pintle, a plunger also pivoted on said pintle, a brace connecting said lever and said plunger and a strip curved in cross section and secured to the outer curved wall of the food container and covering the crack between said pintle and the upper edge of the outer curved wall aforesaid.

In testimony whereof, I affix my signature.

GUY W. FERDON.